United States Patent Office 3,320,314
Patented May 16, 1967

3,320,314
CHLOROBENZYL SULFAMIDES
William J. Houlihan, Mountain Lakes, N.J., assignor to Sandoz Inc., Hanover, N.J.
No Drawing. Filed June 15, 1964, Ser. No. 375,288
6 Claims. (Cl. 260—556)

This application is a continuation-in-part of application Ser. No. 339,354, filed on Jan. 22, 1964, and now abandoned.

This invention is directed to two groups of benzyl sulfamides having one or more chlorine substituents on the sole aromatic ring. These groups are, respectively, of the formulae

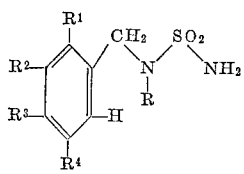

(I)

and

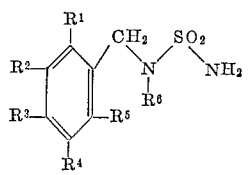

(II)

wherein

R is either lower alkyl having two or more carbon atoms e.g. ethyl, propyl and isopropyl; cyclopropyl; allyl; α-methallyl; β-methallyl or β,β-dimethallyl;

each of $R^1$, $R^2$, $R^3$, $R^4$ and $R^5$ is either a hydrogen atom (—H); lower alkyl, e.g. methyl, ethyl, propyl, isopropyl and butyl; lower alkoxy, e.g. methoxy, ethoxy, propoxy, isopropoxy and butoxy; a fluorine atom (—F); or a chlorine atom (—Cl); at least one of $R^1$, $R^2$, $R^3$ and $R^4$ being a chlorine atom; and $R^6$ is either a hydrogen atom (—H) or methyl.

In Formula II, in addition, at least one of $R^1$, $R^2$, $R^3$, $R^4$ and $R^5$ must be a hydrogen atom, but both $R^1$ and $R^5$ can be other than hydrogen in the same molecule. In Formula I there must be at least one hydrogen atom ortho to the benzyl methylene group.

An object of this invention is to obtain low-cost compounds which have CNS (central nervous system) activity with little or no direct peripheral effects. A further object is to obtain CNS depressants which possess moderate to marked anticonvulsant activity.

These and further objects are accomplished by compounds of both of the above-defined groups.

The preparation of Compounds I and the Compounds II wherein $R^6$ is methyl is accomplished by heating at a temperature within the range of from about 50° to 250° C. and in a tertiary amine (a) secondary benzyl amine (III) and (b) sulfamide (IV):

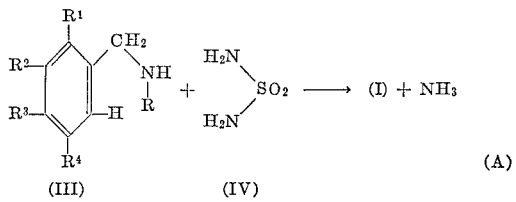

(A)

A reaction temperature in excess of 50° C. is recommended, and a preferred range is from about 55° to about 125° C. Agitation may be employed during the reaction, but none is required.

The tertiary amine medium provides a solvent system in which the reaction takes place. Contemplated tertiary amines include, for example, tri(lower)alkylamines, e.g. triethylamine; (lower)alkyl pyrroles, e.g. N-propyl-pyrrole; pyridine; (lower)alkyl pyridines, e.g. 3-ethyl pyridine; (lower) alkoxy pyridines, e.g. 2,5-dimethoxypyridine; quinoline; (lower)alkyl quinolines, e.g. 8-ethylquinoline; N-(lower)alkyl morpholine, e.g. N-methylmorpholine; and N,N'-di(lower)alkyl piperazine, e.g. N-methyl,N'-ethyl-piperazine.

For the preparation of Compounds II wherein $R^6$ is a hydrogen atom similar reaction conditions are employed; a primary benzyl amine (V) is substituted for the secondary benzyl amine (III), and the reaction medium is an aqueous ethanolic medium:

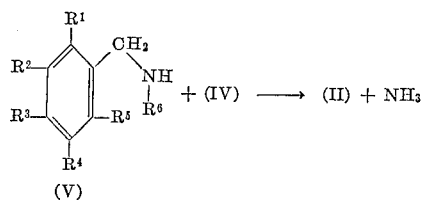

(B)

In both reaction (A) and reaction (B) each of R, $R^1$, $R^2$, $R^3$, $R^4$, $R^5$ and $R^6$ has its above-ascribed meaning. Compounds III and V are prepared from known starting materials according to standard art-recognized procedures.

The temperature at which reactions (A) and (B) are conducted is usually the reflux temperature of the system.

Compounds I and II are useful as anticonvulsants and mild tranquilizers which may be administered either orally or parenterally. Oral dosage forms include tablets and capsules having standard fillers and other compounding constituents. The average daily dose may vary within the range of from 50 milligrams to 300 milligrams.

The following examples illustrate the invention, all temperatures being in degrees centigrade, the parts and percentages being by weight unless otherwise stated, and the relationship between parts by weight and parts by volume being the same as that between the kilogram and the liter.

EXAMPLE 1

*N-methyl-N-2,4-dichloro benzylsulfamide*

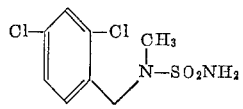

In a flask equipped with a stirrer and a condenser attached to a bubble detector dissolve 19.0 parts (0.10 mole) of N-methyl-2,4-dichloro benzylamine and 9.6 parts (0.10 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol-water. There are thus obtained 18.2 parts of N-methyl-N-2,4-dichlorobenzylsulfamide, melting point (M.P.) 113° to 115°.

In similar manner by separately replacing the N-methyl-N-2,4-dichlorobenzylamine by an equivalent amount of each of:

N-methyl-N-chlorobenzylamine,
N-methyl-N-p-chlorobenzylamine,
N-methyl-N-2,3-dichlorobenzylamine,
N-methyl-N-2,5-dichlorobenzylamine,
N-methyl-N-3,5-dichlorobenzylamine,
N-methyl-N-2,3,4-trichlorobenzylamine,
N-methyl-N-2,3,5-trichlorobenzylamine,
N-methyl-N-2,4,5-trichlorobenzylamine,
N-methyl-N-3,4,5-trichlorobenzylamine and
N-methyl-N-2,3,4,5-tetrachlorobenzylamine, each of the corresponding Compounds I is obtained.

EXAMPLE 2

*N-methyl-N-o-chlorobenzyl sulfamide*

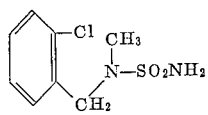

In a flask equipped with a stirrer and a condenser attached to a bubble detector dissolve 12.5 parts (0.08 mole) of N-methyl-o-chlorobenzylamine and 5.8 parts (0.06 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol-water. There are thus obtained 7.1 parts of N-methyl-N-o-chlorobenzyl sulfamide, M.P. 112° to 113°.

In similar manner by separately replacing the N-methyl-o-chlorobenzylamine by an equivalent amount of each of:

N-α-methallyl-N-(3-chloro-2-fluoro-4-isopropyl)-benzylamine,
N-β-methallyl-N-(4-chloro-3-fluoro-2-methoxy)-benzylamine,
N-β,β-dimethallyl-N-(2,3-dichloro-5-isopropoxy)-benzylamine,
N-methyl-N-(2-chloro-3,5-difluoro)-benzylamine,
N-ethyl-N-(2,4-dichloro-3-methoxy)-benzylamine,
N-propyl-N-(2,5-dichloro-4-fluoro)-benzylamine,
N-isopropyl-N-(5-butyl-3,4-dichloro)-benzylamine,
N-allyl-N-3,4-dichlorobenzylamine,
N-propyl-N-2,3,5-trichlorobenzylamine,
N-isopropyl-N-(3-methyl-2,4,5-trichloro)-benzylamine,
N-ethyl-N-3,4,5-trichlorobenzylamine and
N-propyl-N-2,3,4,5-tetrachlorobenzylamine, each of the corresponding Compounds I is obtained.

EXAMPLE 3

*N-methyl-N-3,4-dichlorobenzyl sulfamide*

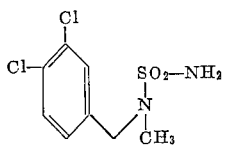

In a flask equipped with a stirrer and a condenser attached to a bubble detector dissolve 15.0 parts (0.08 mole) of N-methyl-3,4-dichlorobenzylamine and 7.5 parts (0.08 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol-water. There are thus obtained 5.2 parts of N-methyl-N-3,4-dichlorobenzyl sulfamide, M.P. 92° to 93°.

In similar manner by separately replacing the N-methyl-3,4-dichloro-benzylamine by an equivalent amount of each of N-cyclopropyl-N-o-chlorobenzylamine,
N-cyclopropyl-N-m-chlorobenzylamine,
N-cyclopropyl-N-p-chlorobenzylamine,
N-cyclopropyl-N-2,3-dichlorobenzylamine,
N-cyclopropyl-N-2,4-dichlorobenzylamine,
N-cyclopropyl-N-2,5-dichlorobenzylamine,
N-cyclopropyl-N-3,4-dichlorobenzylamine,
N-cyclopropyl-N-3,5-dichlorobenzylamine,
N-cyclopropyl-N-2,3,4-trichlorobenzylamine,
N-cyclopropyl-N-2,3,5-trichlorobenzylamine,
N-cyclopropyl-N-2,4,5-trichlorobenzylamine,
N-cyclopropyl-N-3,4,5-trichlorobenzylamine and
N-cyclopropyl-N-2,3,4,5-tetrachlorobenzylamine, each of the corresponding Compounds I is obtained.

EXAMPLE 4

*N-2,4-dichlorobenzyl sulfamide*

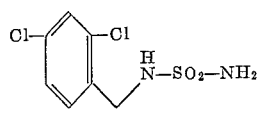

In a flask equipped with a stirrer, condenser and dropping funnel place 150 parts by volume of water, 4.8 parts (0.05 mole) of sulfamide and 8.8 parts (0.05 mole) of 2,4-dichlorobenzylamine. Stir and bring the mixture to reflux. Then add dropwise ethanol until a clear solution results. Continue stirring and refluxing for 10 hours. Cool to room temperature (20°) and filter off the crystalline product. Crystallize from methanol-water. There are thus obtained 6.1 parts of N-2,4-dichlorobenzylsulfamide, melting point 129° to 130°.

In similar manner by separately replacing the 2,4-dichlorobenzylamine by an equivalent amount of each of:

2-chloro-4,5-difluorobenzylamine,
2-butyl-3-chlorobenzylamine,
4-chloro-2-methoxybenzylamine,
2,3-dichlorobenzylamine,
2,4-dichloro-3-ethoxy-5-fluorobenzylamine,
2,5-dichloro-3-fluorobenzylamine, and
2,6-dichloro-4-propoxybenzylamine, each of the corresponding Compounds II is obtained.

EXAMPLE 5

*N-2-chlorobenzylsulfamide*

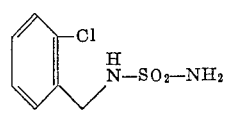

In a flask equipped with a stirrer, condenser and dropping funnel place 14.1 parts (0.10 mole) of 2-chlorobenzylamine, 9.6 parts (0.10 mole) of sulfamide and 300 parts by volume of water. Stir and bring the mixture to reflux. Then add dropwise ethanol until a clear solution results. Continue stirring and refluxing for 10 hours. Cool to room temperature and filter off the crystalline product. Crystallize from ethanol. There are thus obtained 11.7 parts of N-2-chlorobenzylsulfamide, melting point 95° to 96°.

In similar manner, by separately replacing the 2-chlorobenzylamine by an equivalent amount of each of:

2,3,4-trichlorobenzylamine,
2,3,5-trichlorobenzylamine,
5-isopropoxy-2,3,6-trichlorobenzylamine,
6-butoxy-2,4,5-trichlorobenzylamine,
2,4,6-trichlorobenzylamine,
3-isopropyl-2,5,6-trichlorobenzylamine, and
3,4-dichlorobenzylamine, each of the corresponding Compounds II is obtained.

EXAMPLE 6

*N-2,3,6-trichlorobenzylsulfamide*

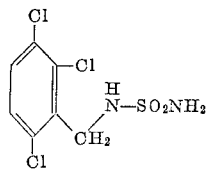

In a flask equipped with a stirrer, condenser and dropping funnel, place 4.2 parts (0.02 mole) of 2,3,6-trichlorobenzylamine, 3.8 parts (0.4 mole) of sulfamide and 80 parts by volume of water. Stir and bring the mixture to reflux. Then add dropwise ethanol until a clear solution results. Continue stirring and refluxing for 10 hours. Cool to room temperature and filter off the crystalline product. Crystallize from ethanol. There are thus obtained 2.9 parts of N-2,3,6-trichlorobenzylsulfamide, melting point 117° to 119°.

In similar manner by separately replacing the 2,3,6-trichlorobenzylamine by an equivalent amount of each of:

3,5-dichloro-4-propylbenzylamine,
3,6-dichloro-5-ethyl-2-fluorobenzylamine, and
6-methyl-3,4,5-trichlorobenzylamine, each of the corresponding Compounds II is obtained.

EXAMPLE 7

*N-3,4-dichlorobenzylsulfamide*

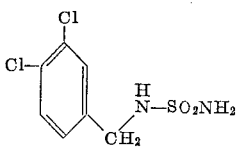

In a flask equipped with a stirrer, condenser and dropping funnel place 11.0 parts (0.062 mole) of 3,4-dichlorobenzylamine, 9.6 parts (0.10 mole) of sulfamide and 150 parts by volume of water. Stir and bring the mixture to reflux. Then add dropwise ethanol until a clear solution results. Continue stirring and refluxing for 10 hours. Cool to room temperature and filter off the crystalline produce. Crystallize from ethanol. There are thus obtained 4.1 parts of N-3,4-dichlorobenzylsulfamide, melting point 106° to 107°.

In similar manner by separately replacing the 3,4-dichlorobenzylamine by an equivalent amount of each of:

2,3,4,5-tetrachlorobenzylamine,
2,3,5,6-tetrachlorobenzylamine, and
2,3,4,6-tetrachlorobenzylamine, each of the corresponding Compounds II is obtained.

EXAMPLE 8

*N-2,5-dichloro-4-methylbenzylsulfamide*

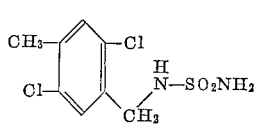

In a flask equipped with a stirrer, condenser and dropping funnel place 6.3 parts (0.033 mole) of 2,5-dichloro-4-methylbenzylamine, 6.0 parts (0.05 mole) of sulfamide and 75 parts by volume of water. Stir and bring the mixture to reflux. Then add dropwise ethanol until a clear solution results. Continue stirring and refluxing for 10 hours. Cool to room temperature and filter off the crystalline product. Crystallize from ethanol. There are thus obtained 4.7 parts of N-2,5-dichloro-4-methylbenzylsulfamide, melting point 107° to 108°.

In similar manner by separately replacing the 2,5-dichloro-4-methylbenzylamine by an equivalent amount of each of:

3-chlorobenzylamine,
4-chlorobenzylamine,
2,5-dichlorobenzylamine, and
2,6-dichlorobenzylamine each of the corresponding Compounds II is obtained.

EXAMPLE 9

*N-2-fluoro-6-chlorobenzylsulfamide*

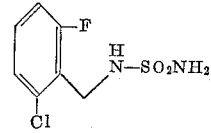

In a flask equipped with a stirrer, condenser and dropping funnel, place 8.0 parts (0.05 mole) of 2-fluoro-6-chlorobenzylamine, 9.6 parts (0.10 mole) of sulfamide and 75 parts by volume of water. Stir and bring the mixture to reflux. Then add dropwise ethanol until a clear solution results. Continue stirring and refluxing for 10 hours. Cool to room temperature and filter off the crystalline product. Crystallize from ethanol. There are thus obtained 4.3 parts of N-2-fluoro-6-chlorobenzylsulfamide.

In similar manner by separately replacing the 2-fluoro-6-chlorobenzylamine by an equivalent amount of each of:

2,4,5-trichlorobenzylamine,
3,5-dichlorobenzylamine, and
3,4,5-trichlorobenzylamine, each of the corresponding Compounds II is obtained.

EXAMPLE 10

*N-methyl-N-2,3,6-trichlorobenzylsulfamide*

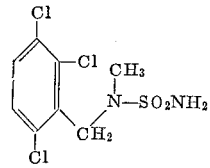

In a flask equipped with a stirrer and a condenser attached to a bubble detector, dissolve 11.25 parts (0.05 mole) of 2,3,6-trichloro-N-methylbenzylamine and 7.2 parts (0.075 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol-water. There are thus obtained 8.3 parts of N-methyl-N-2,3,6-trichlorobenzylsulfamide, melting point 128.5° to 131°.

In similar manner, by separately replacing the 2,3,6-trichloro-N-methylbenzylamine by an equivalent amount of each of:

N-methyl-N-2,6-dichlorobenzylamine
N-methyl-N-(2,4-dichloro-6-fluoro)-benzylamine
N-methyl-N-2,4,6-trichlorobenzylamine,
N-methyl-N-2,3,4,6-tetrachlorobenzylamine,
N-methyl-2,3,5,6-tetrachlorobenzylamine,
N-methyl-N-(3-methyl-2,4,6-trichloro)-benzylamine and
N-methyl-N-(5-methoxy-2,3,6-trichloro)-benzylamine, each of the corresponding Compounds II is obtained.

EXAMPLE 11

*Preparation of starting materials—reductive amination of an aldehyde*

Charge a rocker-type autoclave with 53 parts (0.3 mole) of 2,4-dichlorobenzaldehyde, 150 parts by volume of isopropanol, 25 parts of activated Raney nickel and a solution of 12.4 parts (0.4 mole) of methylamine in 125 parts by volume of isopropanol. Flush the system with nitrogen, and then admit hydrogen thereto until the pressure in the autoclave is 500 pounds per square inch (p.s.i.g.).

Activate the rocker and heat to 50°. After hydrogen uptake is complete (about one hour), cool resulting system to room temperature (20°). Filter the obtained product through Celite. Concentrate the filtrate in a rotary evaporator. Distil the residue to obtain 39.2 parts of N-methyl-2,4-dichlorobenzylamine, boiling point (B.P.) 77° to 80° at 1 mm.

Although this example illustrates the use of specific compounds by necessity, the only limitation with respect to the preparation of starting materials within the contemplation of this invention is that the R of Compound III is limited to ethyl, propyl and isopropyl, and the $R^6$ of Compound V is limited to methyl. It is thus seen that, in place of the methylamine, there is similarly used ethylamine, propylamine or isopropylamine with corresponding results. The 2,4-dichlorobenzaldehyde is likewise replaced by an equivalent amount of any of the corresponding aldehyde precursors of Compounds III and V.

EXAMPLE 12

*Preparation of starting materials—lithium aluminum hydride reduction of a benzamide*

Charge a flask (equipped with a stirrer, dropping funnel, condenser and drying tube) with 10.4 parts (0.2 mole) of the cyclopropylamine and 200 parts by volume of dry toluene. While stirring, add dropwise to the obtained solution 11.5 parts by volume (0.1 mole) of benzoyl chloride at a sufficient rate to raise the temperature to 45°. Stir over night (about 17 hours). Filter off the obtained crystalline cyclopropylamine hydrochloride.

Concentrate the filtrate in a rotary evaporator. Crystallize the resulting solid (10.7 parts) from methanol-water to obtain 9.5 parts of N-cyclopropylbenzamide, M.P. 95° to 97°.

Place in a flask equipped with a stirrer, Soxhlet extraction apparatus and a gas inlet-exit system 500 parts by volume of absolute diethylether and 2.7 parts (0.07 mole) of lithium aluminum hydride. Place 9.5 parts (0.07 mole) of N-cyclopropylbenzamide in a Soxhlet extraction cup, and insert same in the extractor. Blanket the system with nitrogen, agitate and bring to reflux. Reflux until all of the amide has been extracted from the cup. Thereafter, allow the resulting mixture to cool to room temperature.

Admix with the thus-cooled mixture 5.7 parts by volume of ethyl acetate to react with excess hydride. Then add thereto 8.1 parts by volume of 2 N sodium hydroxide to decompose the formed hydride complex. Filter off the resultant salts and wash same with diethylether. Combine the ether wash and the filtrate on a rotary evaporator. Distil the resulting residue (8.8 parts) through a Claisen head. There are thus obtained 5.2 parts of N-cyclopropylbenzylamine, B.P. 50° to 51° at 0.3 mm.

There are no limitations to this illustrative example in so far as the preparation of any compounds within the scope of Compounds III and V is concerned.

EXAMPLE 13

*Preparation of starting materials*

(A) *Preparing the benzyl bromide.*—Place in a flask equipped with a stirrer, dropping funnel and a condenser (equipped with a bubble detector) 0.1 mole of 2,3,6-trichlorotoluene. Stir and heat to about 120°. Then add dropwise thereto 0.105 mole of bromine at a rate sufficient to evolve hydrogen bromide vigorously. Cool the resulting product to room temperature after the addition is complete. Dissolve the obtained crude 2,3,6-trichlorobenzyl bromide in 120 parts by volume of chloroform.

(B) *Preparing primary amines—hydrolysis of the benzyl hexamethylenetetramine salt.*—Cool in an ice bath a solution of 0.1 mole of crude 2,3,6-trichlorobenzyl bromide in 120 parts by volume of chloroform. Admix the thus-cooled solution with a saturated chloroform solution of 15.4 parts (0.11 mole) of hexamethylenetetramine. Stir the obtained solution for 24 hours at room temperature.

Filter the resulting crystalline salt (24.3 parts, M.P. 168° to 176°), and permit the filtrate to stand at room temperature for an additional 24 hours. Filter the additional salt (5.4 parts, M.P. 173° to 180°) precipitated, and combine with that previously obtained to give a yield of 29.7 parts of crude 2,3,6-trichlorobenzyl-hexamethylenetetramine bromide.

Add the crude salt to 55 parts by volume of 6 N hydrogen chloride, and steam distil until a total of 500 parts by volume of steam distillate (formaldehyde) is obtained. Make the liquid in the steam distillate flask basic with 50 percent sodium hydroxide, and extract the resulting product three times with diethylether. Dry the combined ether layers with sodium sulfate. Filter the dried product and distil through a Claisen head. There are thus obtained 9.7 parts of 2,3,6-trichlorobenzylamine, B.P. 96° to 98° at 0.7 to 0.8 mm.

Every primary amine within the scope of Compound V is prepared according to this method.

(C) *Preparing secondary amines from the corresponding benzyl bromide.*—Add a solution of 0.15 mole of crude 2,3,6-trichlorobenzyl bromide in 50 parts by volume of chloroform to a saturated chloroform solution of 0.5 mole of methylamine. Reflux the resulting mixture for four hours, and then allow to stand over night at room temperature.

Filter off the precipitated crystalline methylamine hydrobromide (16.8 parts, M.P. 253° to 255°). Concentrate the filtrate on a rotary evaporator, and distil the residue through a Claisen head. There are thus obtained 24.5 parts of N-methyl-N-2,3,6-trichlorobenzylamine, B.P. 97° at 0.07 mm., that solidify to a material of M.P. 51° to 53°.

The preceding method is suitable for the preparation of all Compounds III and every Compound V wherein $R^6$ is methyl.

It is thought that the invention and its advantages will be understood from the foregoing description. It is apparent that various changes may be made in the structures of Compounds I and II without departing from the spirit and scope of the invention or sacrificing its material advantages. The examples merely provide illustrative embodiments. It is essential for all compounds of this invention that there be at least one chlorine substituent bonded to a ring carbon atom of the aromatic nucleus. In addition Compounds I must have at least one ortho-unsubstituted position on the aromatic nucleus, and Compound II must have at least one unsubstituted position on the aromatic nucleus.

What is claimed is:

1. A compound of the formula

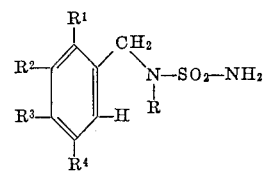

wherein

R is cyclopropyl; and each of $R^1$, $R^2$, $R^3$, and $R^4$ is a member selected from the group consisting of a hydrogen atom, lower alkyl, lower alkoxy, fluoro and chloro; at least one of $R^1$, $R^2$, $R^3$ and $R^4$ being chloro.

2. A compound of the formula

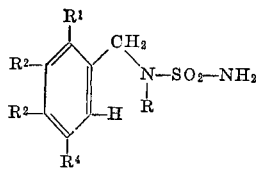

wherein

R is allyl; and each of

R¹, R², R³, and R⁴ is a member selected from the group consisting of a hydrogen atom, lower alkyl, lower alkoxy, fluoro and chloro; at least one of R¹, R², R³ and R⁴ being chloro.

3. N-allyl-N-3,4-dichlorobenzylsulfamide.

4. A compound of the formula

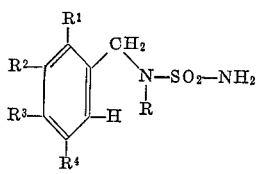

wherein

R is α-methallyl; and each of

R¹, R², R³, and R⁴ is a member selected from the group consisting of a hydrogen atom, lower alkyl, lower alkoxy, fluoro and chloro; at least one of R¹, R², R³ and R⁴ being chloro.

5. A compound of the formula

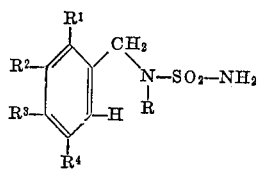

wherein

R is β-methallyl; and each of

R¹, R², R³, and R⁴ is a member selected from the group consisting of a hydrogen atom, lower alkyl, lower alkoxy, fluoro and chloro; at least one of R¹, R², R³ and R⁴ being chloro.

6. A compound of the formula

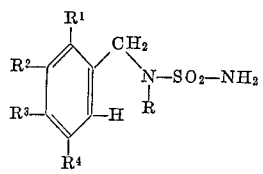

wherein

R is β,β-dimethallyl; and each of

R¹, R², R³, and R⁴ is a member selected from the group consisting of a hydrogen atom, lower alkyl, lower alkoxy, fluoro and chloro; at least one of R¹, R², R³ and R⁴ being chloro.

References Cited by the Examiner

UNITED STATES PATENTS 3,143,549  8/1964  Lafferty _____ 260—340.5 X

FOREIGN PATENTS 947,554  8/1956  Germany.
789,273  1/1958  Great Britain.

WALTER A. MODANCE, *Primary Examiner.*

JOHN D. RANDOLPH, *Examiner.*

HARRY I. MOATZ, *Assistant Examiner.*